United States Patent [19]

Beggs

[11] 4,042,226
[45] Aug. 16, 1977

[54] METHOD AND APPARATUS FOR PRODUCING METALLIC IRON PELLETS

[75] Inventor: Donald Beggs, Charlotte, N.C.

[73] Assignee: Midrex Corporation, Charlotte, N.C.

[21] Appl. No.: 578,477

[22] Filed: May 19, 1975

[51] Int. Cl.$^2$ .............................................. F27B 9/00
[52] U.S. Cl. ..................................... 266/88; 266/155; 266/156; 266/187; 266/197
[58] Field of Search .................... 266/87, 88, 155-156, 266/176, 187, 197; 75/26, 34, 35, 91

[56] References Cited

U.S. PATENT DOCUMENTS

| | | | |
|---|---|---|---|
| 2,860,046 | 11/1958 | Edstrom et al. | 75/91 |
| 3,764,123 | 10/1973 | Beggs et al. | 266/156 X |
| 3,767,389 | 10/1973 | Marion | 75/91 X |

Primary Examiner—Roy Lake
Assistant Examiner—Paul A. Bell
Attorney, Agent, or Firm—Ralph H. Dougherty

[57] ABSTRACT

A method of producing metallic iron pellets in a generally vertical furnace in which a gravitational flow of particulate material is reduced in a reducing zone by a countercurrent flow of a reducing gas containing a reductant, the spent reducing gas is removed and cooled and a portion is introduced as a cooling gas in a cooling zone near the bottom of the furnace while a second portion is employed as a fuel to heat a catalyst through which a gaseous hydrocarbon and steam are passed to form a reducing gas mixture for introduction into the furnace, and a portion of the cooling gas is upgraded in reducing potential and introduced to the reducing zone as reducing gas. Apparatus is also provided for carrying out the method.

5 Claims, 1 Drawing Figure

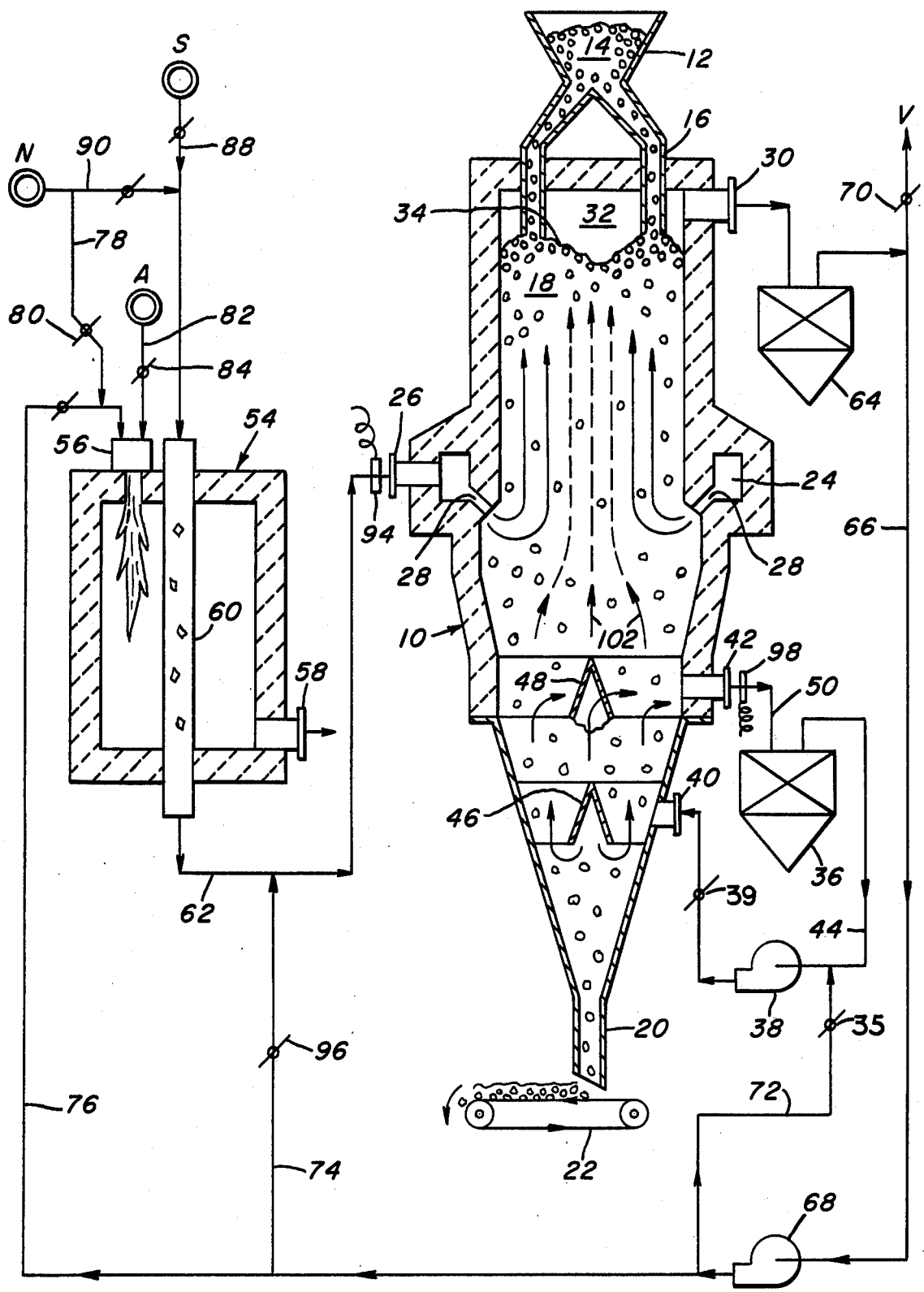

METHOD AND APPARATUS FOR PRODUCING METALLIC IRON PELLETS

BACKGROUND OF THE INVENTION

The recent high cost of scrap as a feed material for steelmaking furnaces has caused steel makers to turn elsewhere for their raw materials. One recently attractive raw material is reduced iron in the form of sponge iron, iron particles, pellets, briquets, and the like, which has been produced by the direct reduction of iron oxides or iron ores. Such materials will hereinafter be referred to collectively as metallized pellets. These metallized pellets are well suited as feed material, particularly to an electric arc steelmaking furnace. As a result, there have been a number of processes developed for their production. To be an attractive feed material, the pellets should be at least 85 percent reduced, and preferably over 90 percent reduced.

U.S. Pat. No. 3,375,099 discloses a direct reduction process in which iron ores are reduced in a shaft furnace by contact with hot reducing gases generated by the incomplete combustion of a mobile fuel, such as natural gas, with oxygen. The spent reducing gases, which are also known as top gases or off gases, are withdrawn from the shaft furnace, cooled and reintroduced at the bottom of the furnace as cooling gases to cool the product. The cooling gas is then allowed to flow upwardly through the shaft furnace thus creating a closed circuit. It is also known that cooling of spent top gas enhances its reducing capacity. U.S. Patent No. 3,748,120 teaches an improved method for reducing iron oxide to metallized iron, in which a reducing gas is catalytically reformed from a mixture of a gaseous hydrocarbon and spent reducing gas from the reduction process. Cooling gas is circulated through the bottom portion or cooling zone of a shaft furnace in a closed loop, that is, the cooling gas is not allowed to flow upwardly into the reducing zone. U.S. Pat. No. 3,799,521 teaches that allowing cooling gas to flow upwardly into the reducing zone of a shaft furnace is detrimental in that it does not permit fully independent control of the reduction and cooling steps of the process. It further points out that to achieve a particular desired degree of carburization, the composition and flow-rate of the coolant gas should be controllable independently of the conditions existing in the reduction zone of the furnace.

When spent top gas is used for cooling the pellet products as shown in U.S. Pat. No. 3,375,099, the gas which flows upwardly into the reducing zone (upflow gas) is not fully preheated, because the flow of cooling gas in actual practice must exceed the theoretical quantity required. That is, the thermal capacity of upflowing gas must exceed the thermal capacity of the descending burden. This precludes the cooling gas being fully preheated by the hot burden. Hot, fresh reducing gas enters the reducing zone through bustle pipes around the perimeter of the furnace forcing the upwardly flowing cooling gas to the center of the furnace, which results in cooling the central portion of the burden in the reducing zone. Further, when the spent top gas is not upgraded prior to introduction as cooling gas, it has poor reducing potential when it enters the reduction zone. These two factors combine to cause incomplete reduction of the burden with a resulting lesser metallization of the product.

OBJECTS OF THE INVENTION

It is the principal object of my invention to provide an improved method for directly reducing particulate metal oxide material to a metallized product in a shaft furnace in which the spent top gas is utilized as coolant gas, with a portion of the coolant gas being further utilized as a reductant in the reducing zone of the shaft furnace.

It is another object of my invention to provide a method of upgrading the cooling gas in reducing potential prior to utilizing it as reducing gas.

It is another object of my invention to provide apparatus for carrying out the methods.

BRIEF DESCRIPTION OF THE DRAWING

My invention is better understood by referring to the following detailed specification and the appended drawing in which:

The single FIGURE is a schematic drawing of a vertical shaft furnace with its associated equipment and reformer furnace as required to practice the invention.

DETAILED DESCRIPTION

A direct reduction process has been developed for producing high quality metallized pellets with an extremely high degree of thermal efficiency. The process employs the continuous catalytic reforming of a hydrocarbon such as natural gas, petroleum distillates, methane, ethane, propane, butane or other readily vaporizable hydrocarbon to product CO and $H_2$ for the reduction process. The continuous catalytic reforming is accomplished in a reforming furnace which employs an indirectly heated catalyst bed. The metallized pellets are cooled by passing a cooling gas, which is spent top gas, through the cooling zone of the reduction furnace in a continuous circuit. The process embraces improvements in the technology of cooling directly-reduced metallized pellets, which is important not only with respect to thermal efficiency of the process but also with respect to obtaining a high degree of metallization of the pellets in a reasonable time. The process is extremely well suited for the production of iron-and-steel-making grade metallized pellets. It will therefore be so described.

The metallized product, which is at least 85 percent reduced and preferably at least 90 percent reduced is produced in a generally vertical shaft furnace having an upper reducing zone and a lower cooling zone. A gravitational flow of metal oxide material or burden is established by charging particulate metal oxide material to the upper portion of the furnace and removing the metallized product from the bottom of the furnace. A reducing gas having CO and $H_2$ as reductant components is introduced to the flow of material through a bustle pipe and tuyere inlet system intermediate the ends of the furnace, flows countercurrent through the material reducing a substantial portion of the metal oxide, and forms a top gas. The top gas is removed from the upper portion of the furnace, cooled, and divided into two portions. The first portion is introduced as a cooling gas through an inlet near the lower end of the furnace. The cooling gas flows upwardly and a portion of it is removed at the top of the cooling zone, scrubbed and cooled, and recirculated in a closed loop. Cooled top gas (make-up gas) is added to the removed cooling gas and the mixture is directed to the furnace through the cooling gas inlet. An amount of cooling gas substantially equal to the amount of make-up gas flows upwardly into the reducing zone, is heated by the hot particulate material, and acts as reducing gas. To effectively cool the hot burden, the flow of cooling gas admitted to the cooling zone must exceed the theoretical quantity, i.e., the thermal capacity of the cooling gas must exceed the thermal capacity of the descending burden. To effectively preheat the portion of cooling gas which flows upwardly into the reducing zone, the flow of this portion must be less than the theoretical quantity, i.e, the thermal capacity of the descending burden must exceed the thermal capacity of the upflow gas. Thermal capacity of a substance is the product of the specific heat of the substance times the flow. The specific heat units could be expressed as BTUs per pound of substance, and the flow units as pounds per hour. Thus the thermal relationship of gas to burden can be expressed:

$$C_g \times W_g \times \Delta T_g = C_b \times W_b \times \Delta T_b$$

Where:
$C_g$ = gas specific heat
$W_g$ = gas flow
$\Delta T_g$ = gas heat change in degrees
$C_b$ = specific heat of the burden
$W_b$ = flow of the burden
$\Delta T_b$ = burden heat change in degrees Specific heat is a constant for each substance. The temperature change is selected by the operator to achieve the proper end temperatures for cooled burden and heated upflow gas. Thus the ratio of burden flow to cooling gas flow is readily determinable and the flowrate of the burden thus determines the optimum cooling gas flow. The cooling arrangement of the present invention comprehends both effective cooling of the burden and effective preheating of the portion of cooling gas flowing upwardly into the reducing zone. The second portion of the cooled top gas may be introduced to a reformer furnace as a fuel to heat a catalyst in a tube in such furnace. A gaseous hydrocarbon and steam are passed through the catalyst, forming a reductant-containing reducing gas which is introduced to the reducing zone of the furnace through the tuyere inlet.

Referring now to the drawing, a vertical shaft furnace 10 has a feed hopper 12 mounted at the top thereof into which iron oxide pellets 14 or other material such as lump ore are charged. The pellets descend by gravity through a plurality of feed pipes 16 to form a bed 18 of particulate iron oxide containing material, or burden, in the shaft furnace. The upper portion of the shaft furnace 10 comprises a reducing zone while the lower portion of the furnace comprises a cooling zone. A pellet discharge pipe 20 is located at the bottom of shaft furnace 10. Reduced material is removed from the furnace by discharge conveyor 22 located beneath discharge pipe 20. Removal of the metallized pellets from discharge pipe 20 establishes gravitational flow of the particulate iron oxide burden in shaft furnace 10.

At the upper portion of the shaft furnace 10 is a bustle and tuyere system, indicated generally at 24, having gas ports 28 through which hot reducing gas is introduced to flow upwardly in counterflow relationship to the movement of the burden 18. The spent top gas exits the furnace through gas takeoff pipe 30 at the top of the furnace. The lower end of pellet feed pipe 16 extends below takeoff pipe 30, which arrangement creates a reacted gas disengaging plenum 32 which permits the gas to exit generally symetrically from the pellet stock line 34 and flow freely to the takeoff pipe 30.

A loop recirculating system is provided at the cooling zone of the furnace to cool the pellets prior to their discharge. This system includes a scrubber-cooler 36, a recirculating gas blower 38, flow-control valve 39, a gas inlet 40 and a gas outlet 42. The blower 38 is located in inlet pipe 44 leading from the scrubber-cooler to the inlet 40. Inlet 40 leads to a gas distributing member 46 located within the furnace 10. Cooling gas collecting member 48 is positioned above the gas distributing member 46 and is connected to scrubber-cooler 36 by pipe 50.

A reformer furnace 54, having fuel fired burners 56, a flue pipe 58 and a plurality of indirect heat exchanger catalyst tubes 60, which are externally heated, only one being shown, generates hot reducing gas. The reducing gas flows from the catalyst tubes 60 to the bustle and tuyere system 24 through gas pipe 62.

The spent top gas leaving the shaft furnace 10 through the takeoff pipe 30 flows to a scrubber-cooler 64 wherein the gas is cooled and the dust particles are removed. Pipe 66 leads from scrubber-cooler 64 to a gas blower 68. Pipe 66 contains a valve 70 in the line for venting cooled top gas if such is desired. Blower 68 is required to circulate the top gas from the scrubber-cooler through pipes 72, 74 and 76. Pipe 72 admits a portion of the top gas to the cooling gas recirculating system at cooling gas pipe 44. Pipe 74 connects to gas pipe 62 to introduce scrubbed and cooled top gas to the hot reformed gas from the reformer furnace to reduce its temperature prior to introducing it to the reduction furnace. Pipe 76 transmits the remaining spent top gas to the reformer furnace as fuel to be used as a source of heat.

A source of a gaseous hydrocarbon such as natural gas delivers such gas to burner 56 through pipe 78 having a flow control valve 80 therein. Combustion air for the burner 56 in the reforming furnace is supplied from source A through pipe 82 having a flow control valve 84 therein. Steam from source S and a gaseous hydrocarbon from source N are introduced to the catalyst tubes 60 through pipes 88 and 90 respectively each of which has a flow control valve therein. Alternative, the reforming oxidant from source S can be $CO_2$ and water vapor from spent reducing furnace top gas.

A temperature sensing element 94 adjacent reducing gas inlet 26 controls the flow of top gas through flow control valve 96 in pipe 74 to balance the flows of hot reducing gas from the reformer and the cooled top gas so the reducing gas mixture entering inlet 26 will be at the desired temperature.

Temperature sensing element 98 located adjacent cooling gas outlet 42 controls valve 39 to maintain the desired exit temperature of the cooling gas at outlet 42.

The hot reducing gas admitted to the shaft furnace 10 through gas introduction ports 28 has a reductant ($H_2$ + CO) to oxidant ($H_2O$ + $CO_2$) ratio of about 8. The spent top gas in pipe 66 after having been scrubbed and cooled in scrubber-cooler 64 has a reductant to oxidant ratio of about 5, containing for example 14% $CO_2$, 3% $H_2O$ and 83% $H_2$ + CO. Because it has a lower reductant to oxidant ratio the spent top gas, even after cooling, is a poor quality reducing gas having poor reducing potential.

It has been found that reduced iron pellets are a good catalyst for the well-known reversible water-gas shift reaction.

$$CO + H_2O \rightleftharpoons CO_2 + H_2$$

At a temperature of about 800° to 1100° F and preferably about 1000° F the water-gas shift reaction appreciably lowers the $CO_2$ content of the cooling gas in the cooling zone while simultaneously raising the $H_2O$ content an equivalent amount. The water vapor thus produced is condensed and removed in the scrubber-cooler 36. The gas which reenters the cooling zone through distributor 46 and flows upwardly from the cooling zone into the reducing zone as indicated by arrows 102 has a reductant to oxidant ratio of about 6.5. Although the preferred cooling gas temperature as monitored at temperature sensing element 98 is about 1000° F the process operates well at temperatures from about 800° to about 1100° F (about 425° to about 600° C).

Table 1 shows the effect of temperature of the cooling gas at outlet 42 on the reductant to oxidant ratio of the cooling gas allowed to flow upwardly as reductant. In this example the reductant to oxidant ratio of the spent top gas entering the cooling system through pipe 72 is 5.25. Note that the ratio of thermal capacities of gas to burden is constant above the cooling zone, but varies in the cooling zone. This occurs because the specific heat of each substance, burden and gas, varies with temperature. The temperature of the burden as it enters the cooling zone is always about the same, the exit temperature of the cooling gas varying according to the cooling gas flow rate.

Whereas in prior processes, cooling gas allowed to flow upwardly through the burden as reductant was not fully heated when reaching the reducing zone and cooled the burden center, the invented process overcomes that disadvantage. By controlling cooled top gas added to the cooling loop recirculating system through flow control valve 35, the upwardly flowing gas 102 is fully preheated by the descending hot particulate material as the gas enters the reduction zone.

Thus the upflow gas is upgraded in three stages: first, the spent top gas is cooled to increase its reducing capacity; second, water is removed from the removed cooling gas, the reductant to oxidant ratio is increased, and the removed cooling gas is cooled; and third, the upflow gas is preheated by the descending burden to the required preheat temperature before it enters the reducing zone.

As can readily be seen from the foregoing, I have invented an improved process for the direct reduction of metal oxides to metallized pellets with a greater thermal efficiency than heretofore possible.

What is claimed is:

1. Apparatus for reducing a metal oxide, comprising:

a. a generally vertical shaft furnace adapted to receive a bed of metal oxide and having a gas inlet and a gas outlet, with at least a portion of said bed being positioned intermediate said inlet and said outlet and forming a reduction zone therebetween;

b. means for cooling gas removed from said furnace via said gas outlet;

c. a passageway communicating between said gas outlet and said cooling means;

d. a cooling gas system connected to said cooling means by a second passageway, said cooling gas system including:

1. a cooling gas inlet for introducing a cooling gas to said furnace below said reduction zone;
        2. means including a cooling gas outlet for removing part of said cooling gas from said furnace above said cooling gas inlet, the portion of said furnace between said cooling gas inlet and said cooling gas outlet forming a cooling zone;
        3. means for cooling said cooling gas removed from said furnace;
        4. a third passageway communicating between said cooling gas outlet and said means for cooling said cooling gas; and
        5. a fourth passageway communicating between said means for cooling said cooling gas, said second passageway and said cooling gas inlet.

2. Apparatus according to claim 1 further comprising means beneath said shaft furnace for removing metallized material.

3. Apparatus according to claim 1 further comprising temperature sensing means adjacent said cooling gas outlet for sensing the temperature of said cooling gas exiting said cooling zone, a gas flow control valve in said fourth passageway adjacent said cooling gas inlet, said temperature sensing means being connected to said valve to control the rate of flow of said cooling gas through said valve.

4. Apparatus according to claim 1 further comprising a reformer furnace containing catalyst tubes for the formation of reductants, a fifth passageway communicating between said second passageway and the fuel inlet of the burner of said reformer furnace for delivering spent top gas to said burner as fuel to heat said catalyst, and means communicating with said gas inlet and said reformer furnace for delivering said reductants to said gas inlet.

5. Apparatus according to claim 1 further comprising a sixth passageway communicating between said second passageway and said reducing gas inlet whereby spent top gas can be introduced to said furnace through said inlet as a portion of the reducing gas mixture.

TABLE I

| Exit Temperature of Cooling Gas | Cooling Gas Flow Rate Through the Cooling Zone in Normal Cubic Meters Per Metric Ton | Ratio of Thermal Capacity of Gas in Cooling Zone to Thermal Capacity of Descending Burden | Gas Up-Flow in Normal Cubic Meters Per Metric Ton | Ratio of Thermal Capacity of Up-Flow Gas to Thermal Capacity of Descending Burden | Reductant to Oxidant Ratio of Up-Flow Gas |
|---|---|---|---|---|---|
| 800 F (425 C) | 922 | 1.83 | 318 | 0.5 | 5.96 |
| 900 F | 804 | 1.60 | 328 | 0.5 | 6.32 |
| 950 F | 755 | 1.51 | 334 | 0.5 | 6.43 |
| 1000 F | 711 | 1.42 | 341 | 0.5 | 6.48 |
| 1050 F | 672 | 1.35 | 351 | 0.5 | 6.47 |
| 1100 F (600 C) | 637 | 1.28 | 363 | 0.5 | 6.41 |

* * * * *